Jan. 15, 1935.  W. F. ECKERT  1,987,928
ROAD FINISHING MACHINE
Filed Aug. 21, 1931    8 Sheets-Sheet 1

Inventor:
William F. Eckert
By Jones, Addington,
Ames & Seibold.
Attorneys.

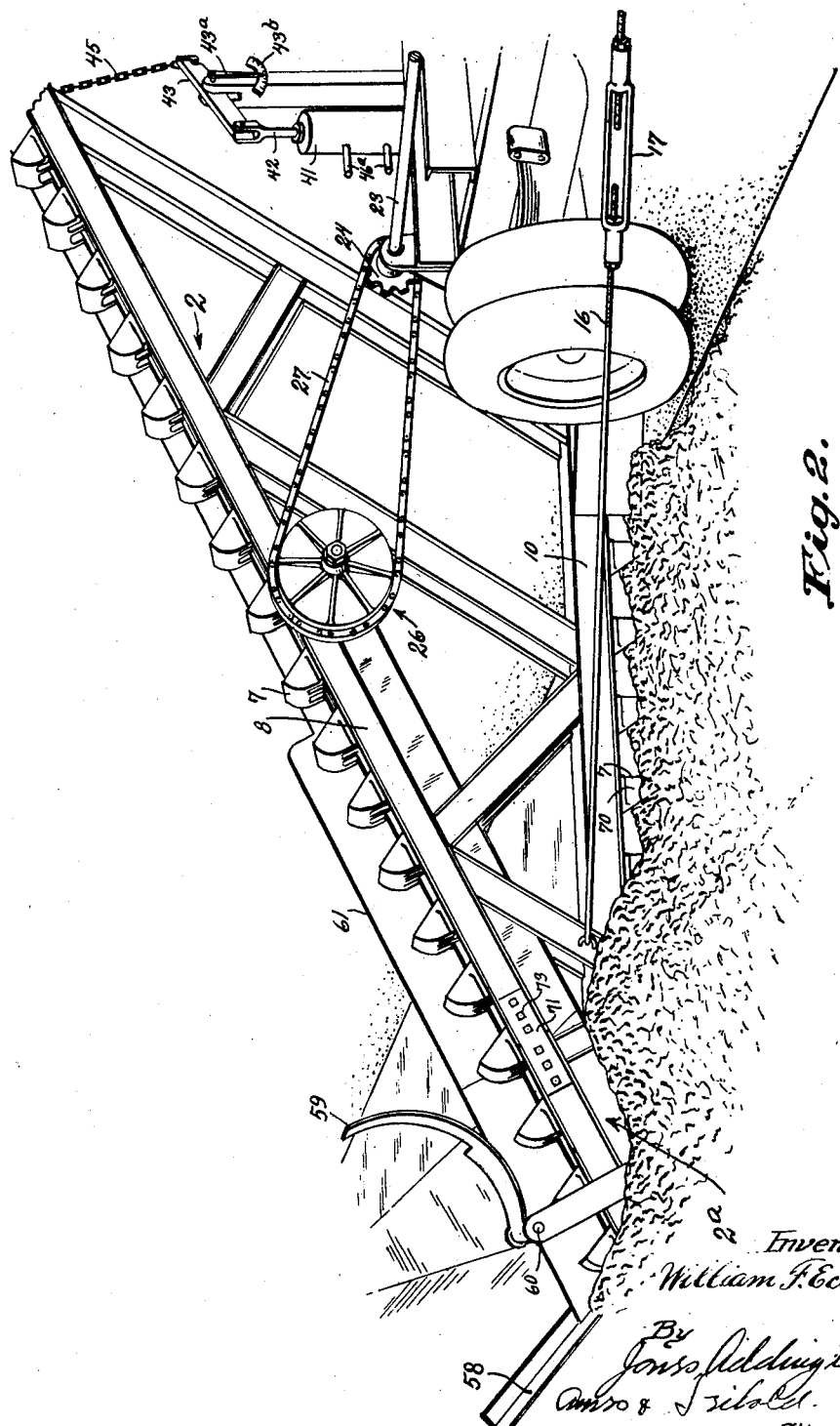

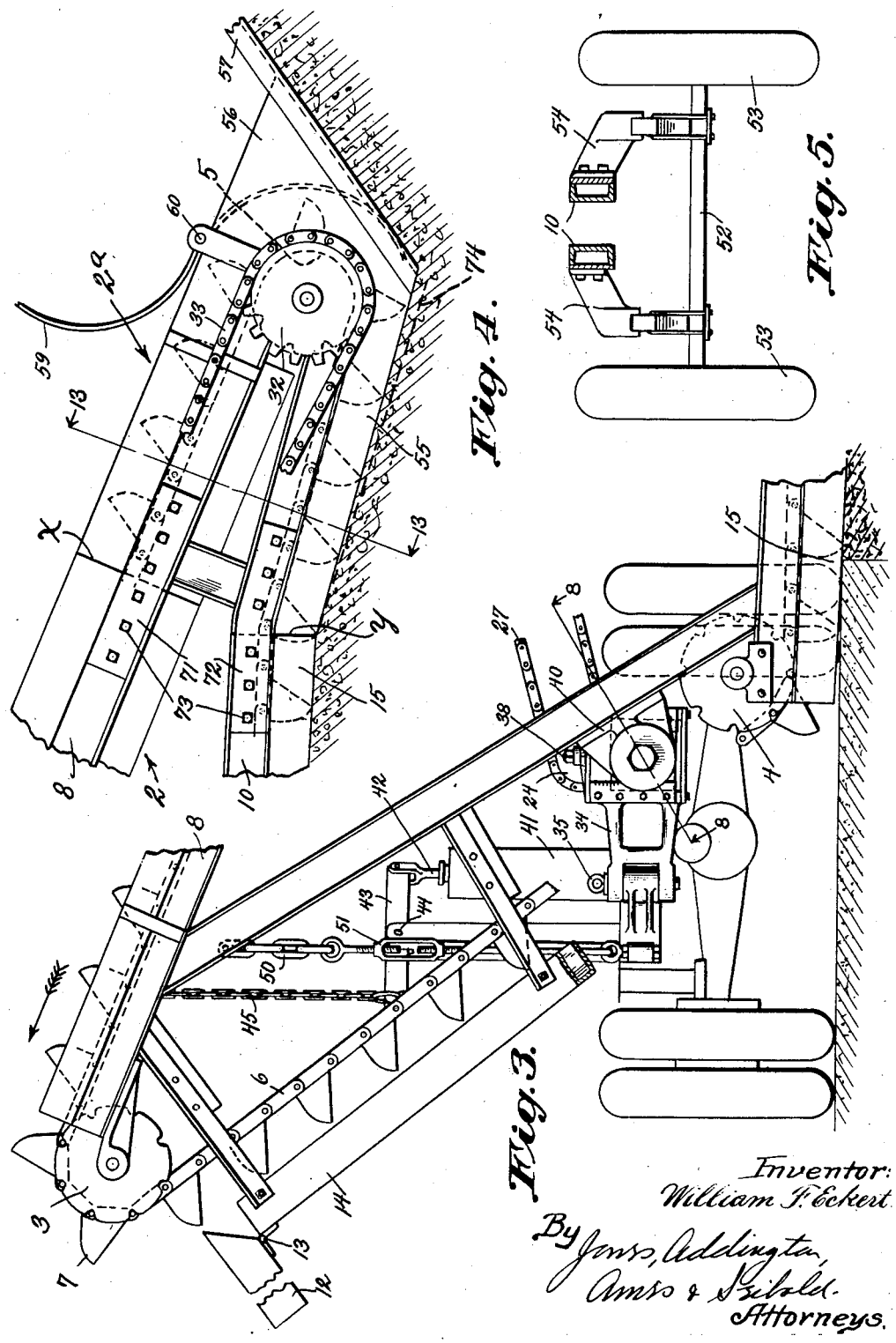

Jan. 15, 1935.  W. F. ECKERT  1,987,928
ROAD FINISHING MACHINE
Filed Aug. 21, 1931  8 Sheets-Sheet 4
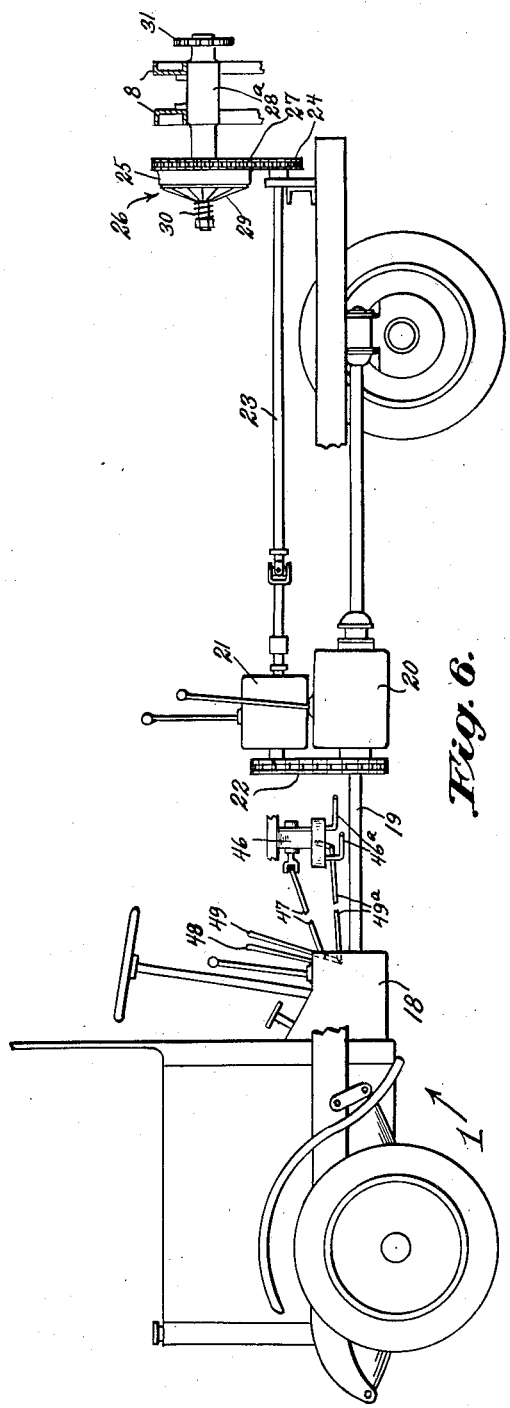
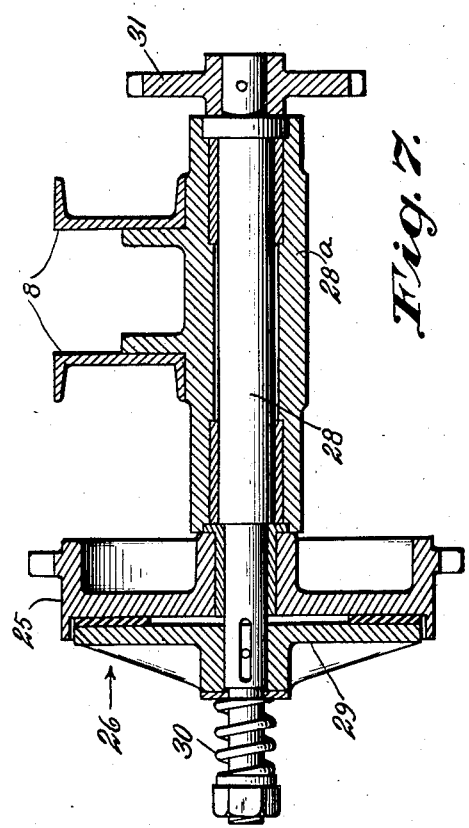
Inventor:
William F. Eckert
By Jones, Addington,
Ames & Seibold
Attorneys.

Jan. 15, 1935.  W. F. ECKERT  1,987,928
ROAD FINISHING MACHINE
Filed Aug. 21, 1931   8 Sheets-Sheet 5
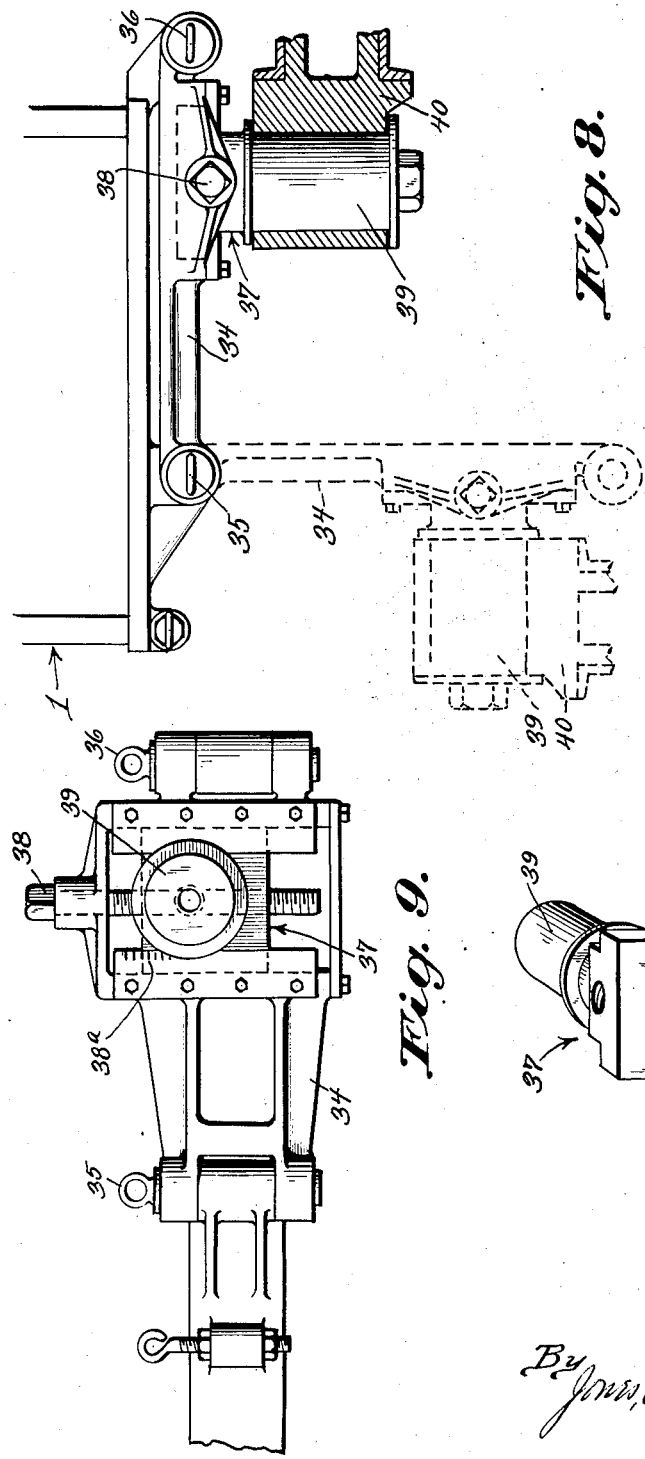
Inventor:
William F Eckert
By Jones, Addington, Ames &
Seibold
Attorney.

Jan. 15, 1935.     W. F. ECKERT     1,987,928
ROAD FINISHING MACHINE
Filed Aug. 21, 1931     8 Sheets-Sheet 6
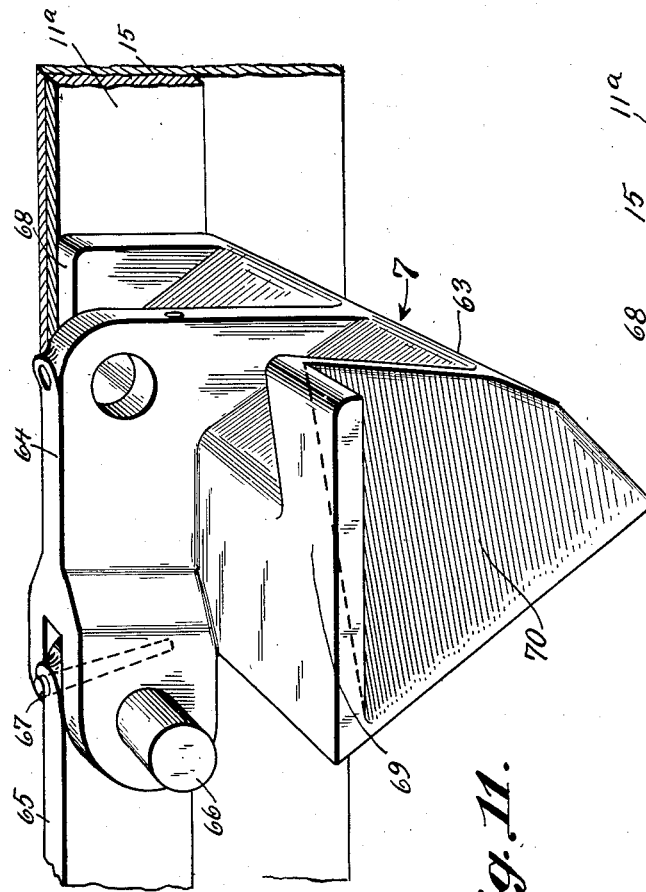
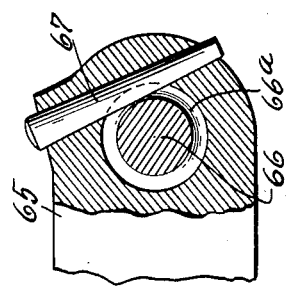
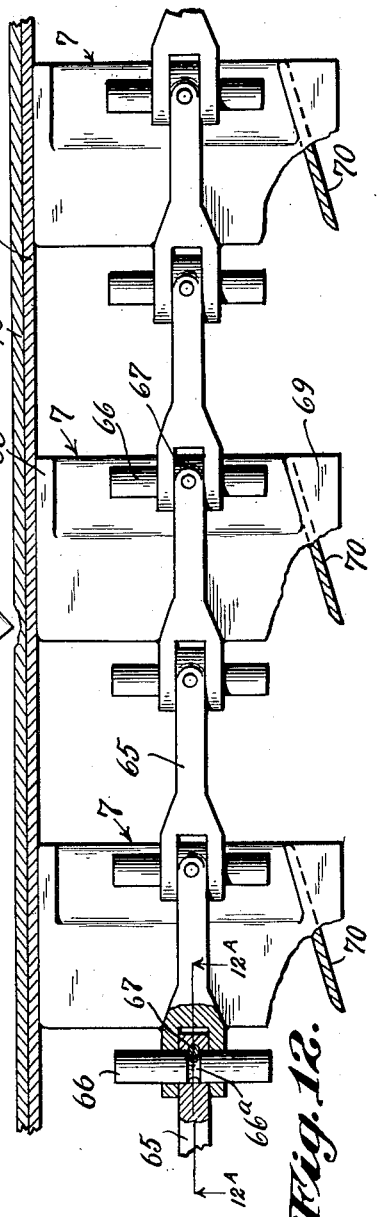
Inventor:
William F. Eckert
By Jones, Addington, Ames
& Seibold
Attorneys.

Jan. 15, 1935.   W. F. ECKERT   1,987,928
ROAD FINISHING MACHINE
Filed Aug. 21, 1931   8 Sheets-Sheet 7

Inventor:
William F. Eckert
By Jones, Addington, Ames
& Seibold.
Attorney.

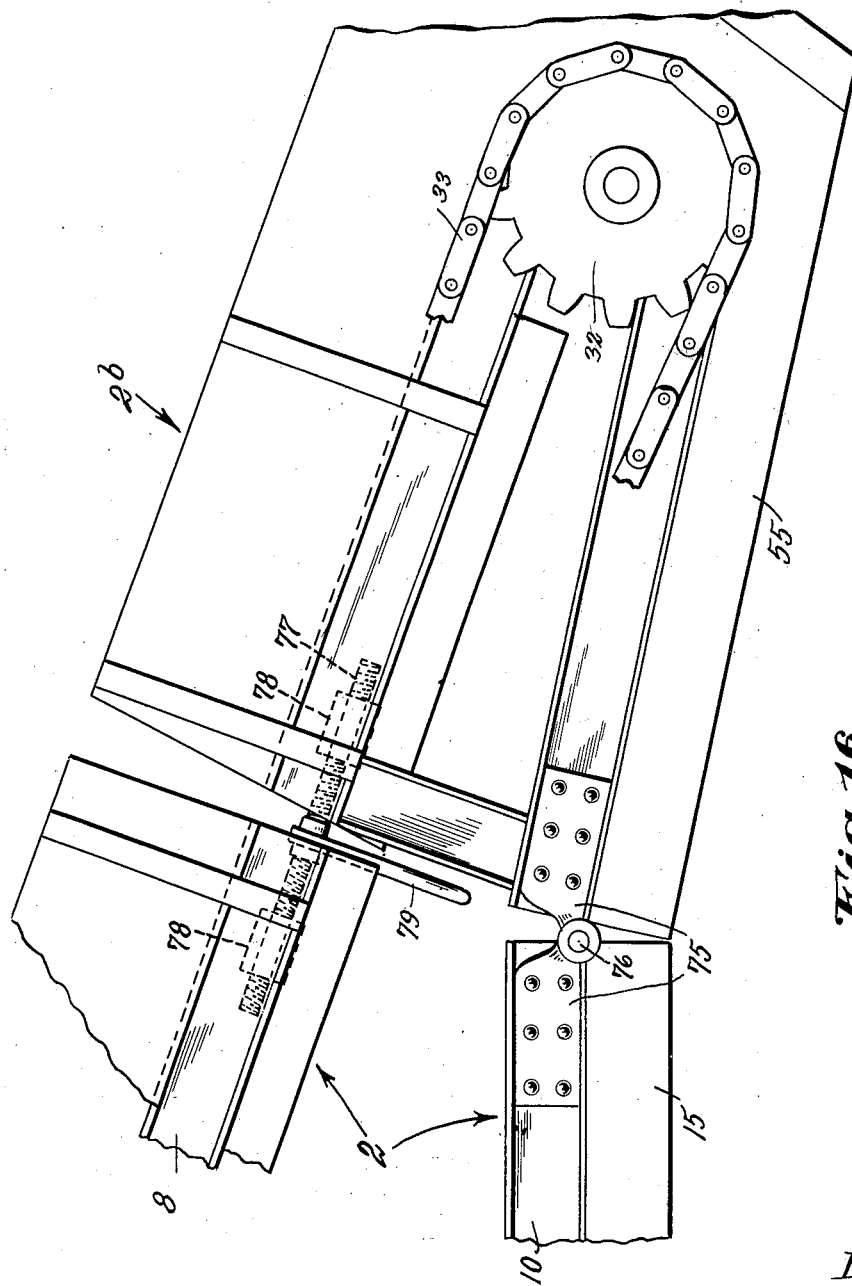

Patented Jan. 15, 1935

1,987,928

UNITED STATES PATENT OFFICE 1,987,928

ROAD FINISHING MACHINE

William F. Eckert, Rochelle, Ill., assignor to The Whitcomb Locomotive Company, Rochelle, Ill., a corporation of Delaware Application August 21, 1931, Serial No. 558,526

21 Claims. (Cl. 37—109)

My invention relates to road finishing machines and more particularly to machines arranged to finish the earth shoulders flush with the pavement or at an angle thereto and which may also simultaneously finish the ditch including the side slope and back slope if desired.

Heretofore it has been the practice in the finishing of shoulders along the side of paved roads to use blade scrapers for roughly forming the shoulders which were then finished by manual labor. This was very slow work and of course necessitated considerable manual labor and proportionately high cost. In the present invention manual labor is almost entirely eliminated and the machine may be operated, after the preliminary use of the blade scraper, to completely finish the road shoulder and ditch including the side and back slopes and to remove the excess dirt from the shoulder and ditch contour and accurately shape the shoulder and ditch for the final acceptance of the inspectors.

The present embodiment comprises a device consisting of an endless chain having scraping and elevating buckets or blades thereon and operating on a rigid frame or boom which latter is pivotally mounted on a heavy duty truck. The truck is provided with a plurality of variable transmissions arranged to give the necessary slow speeds and the grade is maintained by a hydraulic hoist controlled by the driver and which moves the conveyor frame relative to the pavement to provide the necessary angular shoulder to conform to the specifications. The buckets are arranged to travel across the shoulder and ditch contour conveying the excess soil up and over the machine and loading it into a dump truck which travels along beside the machine.

A desirable feature of the present invention is the provision of power means, preferably hydraulic, whereby the conveyor frame may be pivotally adjusted in a substantially vertical plane so as to raise the outer end of the boom to clear obstructions or to vary the angle of the shoulder and to hold the cut to a specified grade. The hydraulic adjusting means also provides for taking two or more light cuts over the same ground to clean up an accumulation of material alongside of the road by going through it with the conveyor, then hoisting the boom, backing the truck and going through with the conveyor again, the boom being positioned to progressively lower the accumulation of material. Means also are provided for pivoting or hinging the conveyor frame to the truck so that it may be moved or may freely move to a trailing position.

Auxiliary carrier means is provided for the conveyor frame and in the present instance comprises a dolly including an axle having auxiliary truck wheels thereon and which may be detachably secured adjacent the outer end of the conveyor frame and by means of which the frame may operate as a trailer, whereby, due to the combined functions of the dolly and the hinged and pivoted connection of the frame and truck, the conveyor frame may be allowed to automatically move to or from a trailing position when desired.

It is, therefore, an object of my invention to provide an earth-working machine having a finishing portion normally secured in transverse relation with a truck and provided with means to permit the finishing portion to swing into trailing alignment with the truck when the truck is moved.

A further object is provision of improved means which may be hydraulically operated, cooperating with the finishing portion to raise or lower the finishing portion and bucket conveyor thereon as a whole relative to the truck for clearing the edge of the pavement during the finishing operation.

An auxiliary power take-off means including a variable transmission is provided for driving the buckets of the machine from the truck motor at desired speeds relative to the forward speed of the truck as well as means for automatically disconnecting the power in the event of overload.

Another and important object of the device is to provide buckets having angularly disposed sides whereby the synchronization of the motor speed with the speed of the buckets will cause the angle side of the bucket to travel through the earth in a straight line substantially coincident with the angle and without appreciable side pressure.

An indicating means is provided in conjunction with the hydraulic hoisting means, whereby the angular position of the finishing frame is at all times visibly indicated to the operator and the hoist may be controlled accordingly.

The road specifications for various localities may call for various angular relations of the shoulder and ditch contour, and means is provided whereby that part of the boom arranged for forming the ditch contour may be adjusted relative to the shoulder forming portion so that any desired relative angular relation may be obtained and maintained within the required limits of the specifications.

Provision is also made for rigidly securing interchangeable ditch forming portions to the boom or to attach these portions in various angular relations.

Further objects will be apparent from the specification and the appended claims. In the drawings, Figure 1 is a perspective view of the complete machine, the frame portion being raised and mounted on auxiliary carrier wheels and moved to a trailing position relative to the truck, the dirt chutes being removed for convenience in allowing the frame to automatically take a trailing position;

Fig. 2 is a perspective view of the machine in operation on a highway, a portion of the truck and frame being broken away for convenience in illustration;

Fig. 3 is a rear view of the machine in operative position on a pavement, portions being broken away for convenience in illustration and the pavement being shown in section;

Fig. 4 is a rear elevation of the outer end of the finishing frame in operative position and illustrating the manner in which the side and back slopes are formed;

Fig. 5 is a transverse section through the lower channel irons of the boom member and illustrates the manner of attaching the dolly or auxiliary trailer wheels;

Fig. 6 is a diagrammatical elevation of the truck illustrating the plural transmission means for operating the truck and the bucket conveyor chain; also illustrating the means for driving and controlling the pump for operating the hydraulic hoist;

Fig. 7 is a transverse sectional view through the overload friction clutch and bearing which is mounted on the upper boom channel irons and forms a part of the bucket chain driving mechanism;

Fig. 8 is a top plan view of the hinge mechanism by which the bucket carrying frame is mounted on the truck; and also illustrates the method of pivoting the frame for vertical movement, the frame bearing being shown in section on a line substantially corresponding to line 8—8 of Fig. 3;

Fig. 9 is a rear view of the hinge and pivot members illustrated in Fig. 8 with the frame removed from its trunnion;

Fig. 10 is a perspective view of the trunnion block illustrated in Figs. 8 and 9;

Fig. 11 is a perspective view of one of the buckets;

Fig. 12 is a fragmentary top plan view of the buckets and their chain assembly, the scraper being shown in horizontal section and a portion of the buckets being broken away to show the angular relation of their sides;

Figure 15:
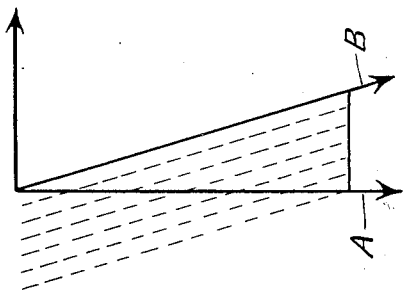
Figure 14:
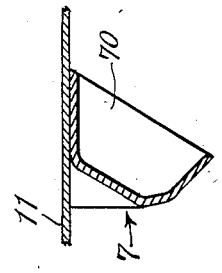
Figure 13:
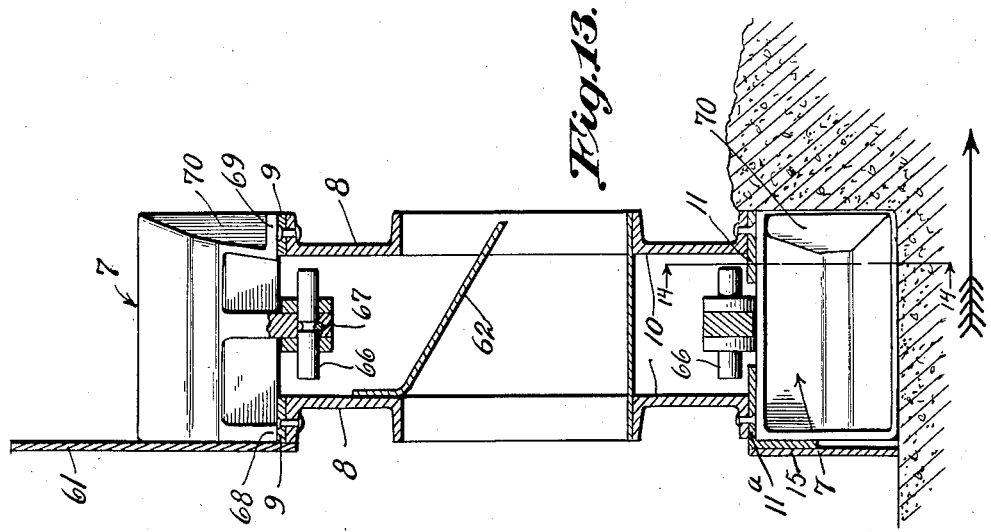

Fig. 12ᵃ is a detail section taken on a line corresponding to line 12ᵃ—12ᵃ of Fig. 12 and illustrates the method of mounting the bucket chain rollers for free rotation;

Fig. 13 is a transverse sectional view of the conveyor frame and taken on a line corresponding to line 13—13 of Fig. 4;

Fig. 14 is a sectional view through one of the buckets and wear plate and taken on a line corresponding to line 14—14 of Fig. 13;

Fig. 15 is a diagrammatic view illustrating the relative movements of the buckets and truck relative to the angular sides of the buckets; and Fig. 16 is a side elevation of a preferred form of boom construction in which the outer portion of the boom is adjustably mounted, whereby the angular relation of the ditch forming portion and the shoulder forming portion may be relatively adjusted to form a ditch and shoulder in angular relation conforming to specified requirements.

Referring to the drawings in detail, the embodiment illustrated comprises a truck 1 and a substantially obtuse triangular shoulder finishing frame or boom 2 including a removable ditch forming portion 2ᵃ. This frame or boom is preferably made up of spaced channel irons having their flanges turned outwardly and welded or otherwise secured together to form a rigid triangular conveyor frame, suitable brace members being provided therefor as illustrated.

Sprocket guide wheels 3, 4, and 5 are mounted adjacent the upper, lower, and outer apexes, respectively of the frame and in alignment between the channel irons. These guide wheels are arranged to support and guide an endless chain 6 having a plurality of spaced buckets 7 thereon. The upper channel irons 8 are provided with wear plates 9 secured thereto and on which the buckets are arranged to slide during their upward travel, the lower channel irons 10 being provided with inwardly extending wear plates 11 and 11ᵃ secured thereto as illustrated in Fig. 13. These wear plates are subject to considerable friction and may be easily removed and new plates substituted when they become unduly worn. During operation the chain 6 is constantly driven in such a manner that the lower flight travels outwardly and around the guide wheel 5 to finish the shoulder and ditch contour and the dirt removed therefrom is carried upwardly and inwardly by the upper flight of buckets to be dumped into a truck which moves on the pavement adjacent the inner end of the frame.

The upper flight of buckets is constantly moving in the direction of the arrow shown in Fig. 3, and a chute 12 is pivoted at 13 on the upper end of a chute 14 which latter is mounted on the frame 2 as indicated. With the chute 12 in the position shown in Fig. 3, the buckets will discharge the dirt therein through which it will be delivered into a suitable truck. However, the chute 12 may be raised to a position where it will be co-extensive with chute 14 and in which position it will cut off the discharge of the dirt into the truck and the dirt will be guided through the chute 14 back to the shoulder. Any suitable means may be provided for adjusting the chute 12 and holding it in its adjusted position. It will be obvious that whenever a low spot in the shoulder is encountered, the operator may cut off the discharge of dirt to the truck by adjusting the chute 12 thereby throwing the dirt back to the shoulder to make a fill.

The wear plate 11ᵃ is in the form of an angle iron and a scraper blade 15 is secured to the downwardly extending flange thereof adjacent the lower flight of buckets. The angle iron forms a guide for the buckets and the scraper assists in determining the contour of the road shoulder and side slope, this contour conforming to the required specifications.

In normal operation the frame 2 stands at right angles to the truck in which position it is secured by means of a tie rod 16 which is provided with a turnbuckle 17 for accurate adjustment. The truck 1, Fig. 6, is provided with the usual variable transmission 18 and drive shaft 19 and an auxiliary variable transmission 20 is interposed between the transmission 18 and the rear axle whereby any desired truck speed may be obtained.

The conveyor or bucket chain 6 is driven from the drive shaft 19 through a suitable variable transmission 21 and suitable sprockets and chain 22. The conveyor transmission 21 is provided with a drive shaft 23 having a sprocket 24 thereon which is connected to the driving sprocket 25 of a suitable friction clutch 26 by means of a chain 27. The friction clutch 26 forms a part of the transmission for driving the bucket chain 6 and comprises the driving sprocket 25 loosely mounted on a shaft 28 which latter is mounted in suitable bearing 28ª secured to the channel members of the frame as shown in Fig. 7. A driven member 29 of the clutch is slidably mounted on the shaft 28 and retained in frictional engagement with the driving sprocket member 25 by means of a spring 30. The shaft 28 is connected to drive the rear chain guide sprocket 5 by means of a sprocket 31 secured to the shaft 28 and a sprocket 32 on the shaft of the bucket chain sprocket 5, the sprockets 31 and 32 being connected by a chair 33.

By means of the above combination of transmissions and driving mechanisms, the travel of the buckets may be synchronized with the forward movement of the truck which is an important feature of the invention for convenience in operation and for reasons which will be described later. It also provides for increased efficiency with lower power requirements.

The means for mounting the conveyor portion 2 on the truck is illustrated in Figs. 3, 8, and 9 and comprises a hinge member 34 pivoted at 35 on the rear of the truck frame and which normally forms a latch member which is secured in the position illustrated in full lines in Fig. 8 by means of a latching pin 36. A trunnion block 37 is mounted for vertical movement in suitable guides in the hinged member 34 and is movably supported therein by means of a screw 38 threaded through the trunnion block. Suitable graduations are indicated on the trunnion guide at 38ª whereby the frame may be accurately adjusted by turning the screw to provide a suitable clearance between the end of the scraper blade 15 and the pavement. The conveyor frame 2 is mounted on the outwardly extending trunnion portion 39 by means of a bearing 40 secured to the frame as indicated in Fig. 3. This type of pivotal mounting allows the frame 2 to be swingingly adjusted in a substantially vertical plane transverse to the direction of the movement of the truck, and when it is desired to trail the frame, it is only necessary to raise the outer end and secure a suitable dolly thereunder, then remove tie rod 16 and the latching pin 36 and the forward movement of the truck will then cause the frame 2 to automatically swing to a trailing position as indicated in the dotted lines in Fig. 8. This is a very important feature as heretofore in machines of this type, it has been necessary to entirely dismantle the frame in order to move the device through narrow openings such as viaducts or when it was desired to transport the machine for any great distance. In the present device the frame automatically moves to a trailing position when the truck is moved forward and by backing up the truck the frame automatically moves to operating position where it may be secured by inserting the pin 36 and securing the tie rod 16 and adjusting its turnbuckle 17.

In order to swingingly adjust the frame 2 on the trunnion block 37, hydraulic power means is provided which is under control of the driver and which may be operated to tilt the frame to provide any desired shoulder angle relative to the pavement. This hydraulic mechanism comprises a cylinder 41 having a piston 42 thereon which latter is connected to the frame by means of a lever 43 pivoted at 44 on a suitable support on the truck, the opposite end of the lever 43 being connected to the frame by means of a chain 45.

A pump 46 (Fig. 6) is mounted on the truck and arranged to be driven from the usual power take-off of the transmission 18 by means of a shaft 47 having suitable universal joint connections. A handle 48 controls the power take-off to start and stop the pump 46, and a handle 49 controls the pump output through a link 49ª to effectively operate the hoist as desired and to retain it in any desired position. The pump is of an ordinary commercial type and further description is believed unnecessary.

The pump is connected to the cylinder 41 by means of suitable conduits 46ª whereby the piston 42 may be hydraulically operated to raise or lower the outer end of the frame 2 in order that the angular relation of the shoulder to the pavement may be changed to conform to the desired specifications or to raise the outer end of the boom to insert the trailing dolly thereunder. The frame may also be raised to pass over any obstructions. The angular movement of the frame may be limited, if desired, by means of a chain 50 secured to the frame and the truck as shown in Fig. 3 and provided with a turnbuckle 51.

An indicator arm 43ª is attached to the pivot shaft 44 of the lever 43 and cooperates with a graduated segment 43ᵇ on the support for indicating to the operator the angular displacement of the conveyor frame and scraper blade 15.

The trailing dolly as illustrated in Fig. 5 comprises a shaft 52 having wheels 53 thereon and provided with brackets 54 which are arranged to be removably secured to the lower channel irons 10.

The scraper blade 15 determines the angular surface of the road shoulder, the cooperating scraper portions 55 and 56 determine the angular contour of the ditch including the side and back slopes and an angle iron 57 is secured to the portion 56, the inner edge 58 thereof extending forwardly in a cutting position in order to scrape the dirt from the back slope and cause it to drop downwardly into the path of the buckets 7.

A curved member 59 is provided on the frame at 60, and when there is no back slope to be formed, may be used in the position illustrated by the dotted lines in Fig. 4. In this position it assists in retaining the dirt in the buckets as they are carried around the guide sprocket 5, or the member 59 may be retained in the raised position when there is no back slope thereby allowing the buckets to discharge the dirt outwardly to provide a fill.

A guard plate 61 is secured to one of the channel irons 8 adjacent the upper flight of buckets as shown in Fig. 13. This is to prevent dirt from the buckets from falling on the finished shoulder. Another guard 62 is also secured to the channel member and in an angular position to direct any dirt which falls between the channel irons toward the front of the machine.

The buckets and their assembled relation are shown in Figs. 11 to 14 inclusive and each bucket comprises a scoop portion 63 having an integral link portion 64 thereon. The buckets are secured together by intermediate links 65 which are pivoted to the buckets by means of bearing pins or rollers 66, which latter are retained in bearing position by means of standardized hardened taper pins 67 extending into suitable slots 66ᵃ in the pins whereby the rollers are allowed to rotate. The buckets are provided with bearing surfaces 68 and 69, which are arranged to engage the wear plates 9, 11, and 11ᵃ on the channel irons of the frame 2 over which they are guided. The bearing pins 66 form supports for engaging the lower inwardly extending wear plates 11 and 11ᵃ and supporting the buckets when the frame 2 is raised from the operating position.

The front side 70 of each bucket is angularly disposed as illustrated in Figs. 11 and 12 and this angular arrangement of the side of the bucket is such that the speed of the bucket chain may be synchronized with the forward speed of the truck so that the angular side of each bucket travels through the earth in a straight line coincident with the angle and corresponding to the hypothenuse of the triangle illustrated in Fig. 15 in which the side adjacent, indicated by the arrow A, corresponds to the travel of the bucket when the truck is stationary. The side opposite corresponds to the travel of the truck during the time the bucket is traveling the length of the hypothenuse in the direction indicated by the arrow B. The dotted lines indicate the paths of the angular sides of the buckets, or of other types of cutting blades which may be used if desired.

It has been found that when the buckets are rectangular with their sides at right angles to the direction of the travel of the truck the resistance of the earth against the sides of the buckets tends to move the truck to an angular position on the pavement and it has previously been necessary to use some guide means against the edge of the pavement in order to resist this pressure and to hold the truck in alignment. However, with the angular construction of the buckets illustrated this side resistance has been almost entirely eliminated and much greater efficiency and speed in operation have been attained. It has been found possible to operate the machine at a much faster rate and with considerably less power. Due to the individual specifications of each state, the conveyor frame and scraper blades thereon are built according to the requirements of the state in which the machine is to be operated. It is only necessary to make the contour of the lower portion of the frame and the scraper blades conform with state requirements, and the rigid contour of the boom and scrapers will control the shaping of the shoulder and ditch to the desired specifications at all times.

Figure 1:
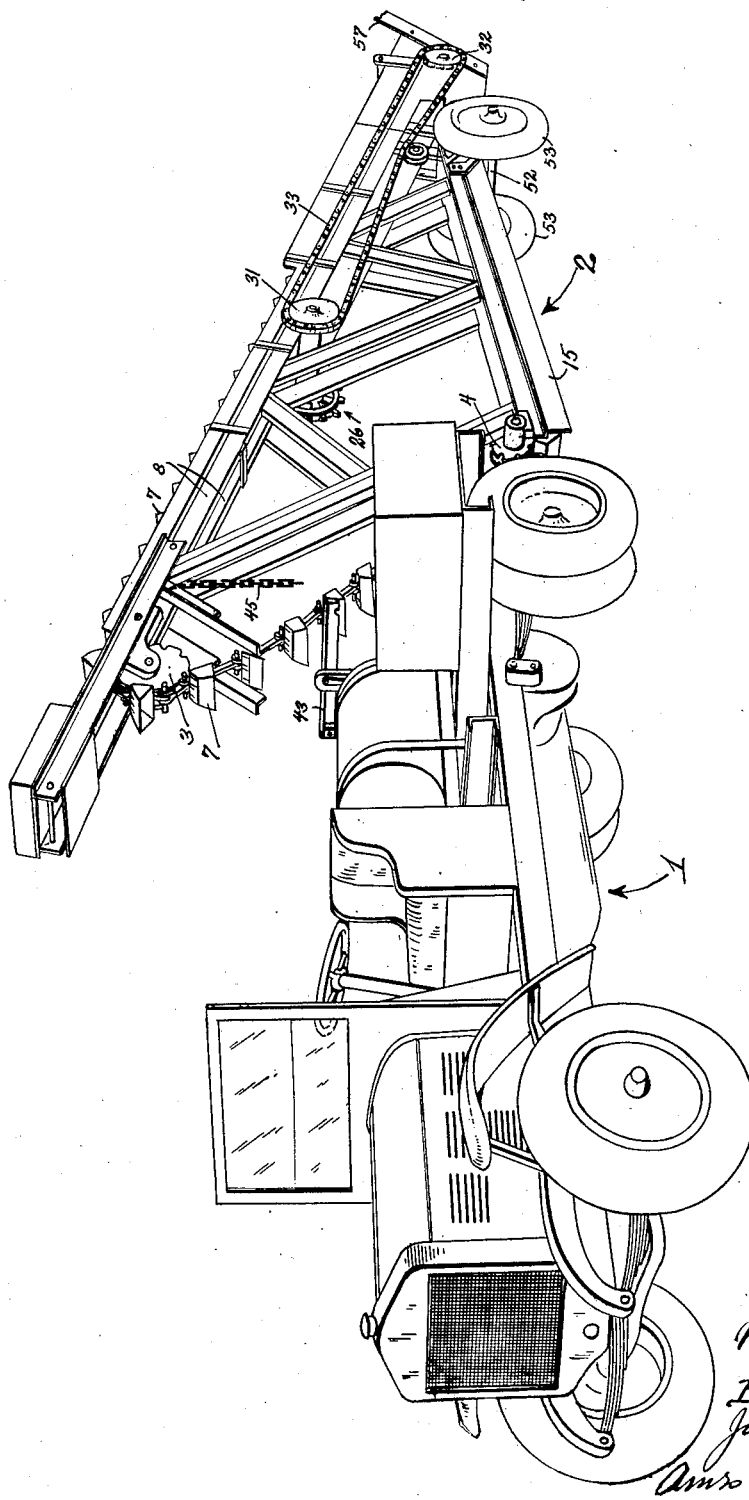

The entire operation of the machine may be controlled by the driver although a helper usually accompanies the machine to remove heavy stones and other obstructions from its path. In operation the machine is moved to the desired location with the conveyor frame in the trailing position as illustrated in Fig. 1, and by backing up the truck the conveyor frame automatically assumes the transverse angular position illustrated in Fig. 2, in which position it is secured by inserting the pin 36 thereby locking the hinge member 34 shown in Fig. 8. The tie rod 16 is secured in place and the trailing dolly is removed. The conveyor driving chain 27 is then placed in position on the sprockets and the height of the conveyor frame is adjusted by means of the trunnion block adjusting screw 38 so that the scraper blade 15 just clears the edge of the pavement. The specified angular adjustment of the frame and scraper blades is obtained by suitable operation of the hydraulic hoist previously described, and which is at all times under the control of the driver.

The truck is moved forwardly with the right-hand wheels adjacent to and in alignment with the edge of the pavement and the operator, by suitable control of the truck variable transmissions 18 and 20 and the conveyor variable transmission 21, synchronizes the speed of the conveyor and buckets thereon with the speed of the truck in such a manner that the resultant travel of the buckets substantially corresponds to the angle of their sides.

The indicator arm 43ᵃ and cooperating graduated segment 43ᵇ indicate at all times the angular position of the boom relative to the truck and the operator may, therefore, change this angular position at will by manipulation of the control handles 48 and 49 for controlling the pump 46 and the consequent operation of the hydraulically operated piston 42. The operator is thereby able to vary the angle of the shoulder relative to the pavement whenever required by the specifications. This is an important feature and especially on banked curves where the grade remains the same but the angle changes relative to the pavement.

The ditch forming portion 2ᵃ of the boom 2 is removably mounted and detachable along the lines X and Y, the cooperating portions of the channel irons 8 and 10 being secured together by means of plates 71 and 72, respectively, and suitable bolts or rivets 73. Any number of the ditch-forming portions 2ᵃ may be provided with different side and back slope angular relations corresponding to various specification requirements as indicated by the dotted line 74. Any desired ditch-forming portion having the required angular contour for a particular specification may then be interchangeably mounted by means of the plates 71 and 72, or if desired the angular position of any one of the ditch-forming portions 2ᵃ may be varied by forming an interchangeable set of plates 71 and 72 with rivet or bolt holes correspondingly spaced to secure the ditch member in the desired angular position.

Figure 16 illustrates a preferred form of construction in which a ditch-forming portion 2ᵇ corresponding to the portion 2ᵃ is adjustably mounted by means of hinge members 75 secured to the cooperating parts of the channel irons 10 and pivoted at 76. The portion 2ᵇ may be angularly adjusted by means of a jack-screw 77 having right and left hand threads thereon and which is threaded in suitable trunnion blocks or brackets 78, which latter are secured to the cooperating portions of the channel irons 8. The jack-screw 77 is provided with a ratchet wrench 79 mounted thereon and which is provided with the usual means for rotating the jack-screw 77 in either direction. It will be noted that by manipulation of this ratchet wrench 79 the angular relation of the side slope scrapers 66 may be changed to meet the requirements of the specification.

It will be understood that the structure may be varied from the specific embodiment herein illustrated without departing from the spirit of the invention, and I, therefore, desire to be limited only by the scope of the prior art and the appended claims.

Having thus described my invention, what I claim and desire to secure by Letters Patent is:

1. A machine of the character described comprising a power carrier arranged to travel on a pavement, a transverse conveyor frame pivotally mounted on said carrier for vertical and horizontal movement, means for securing said frame in transverse position, said frame being releasable to allow it to automatically move to a trailing position when said carrier is advanced.

2. A machine of the character described comprising a power carrier arranged to travel on a pavement, a transverse conveyor frame mounted for free pivotal movement in a substantially vertical plane and movable to a trailing position substantially in alignment with the carrier, means under the control of the operator for adjustably limiting the vertical pivotal movement, and releasable means to allow free swinging movement to a trailing position.

3. A road construction machine comprising a motor vehicle having power means and a plurality of variable vehicle driving transmissions, a boom member mounted adjacent the end of said vehicle and mounted for adjustable swinging movement in an approximately vertical transverse plane, an endless conveyor scraper carried by said boom member for travel transversely of the vehicle, and auxiliary variable transmission means for driving said conveyor and having power take-off means between said vehicle transmissions.

4. A machine of the character described comprising a power carrier, a conveyor boom member hinged to said carrier for vertical and horizontal movement relative thereto, means for locking said conveyor member in a position transverse to said carrier to allow vertical adjustable swinging movement only, said locking means being releasable to allow the conveyor member to move to a trailing position and to allow both vertical and horizontal movement.

5. A machine of the character described comprising a power carrier, a conveyor boom member hinged to said carrier for vertical and horizontal movement relative thereto, means for locking said conveyor member in a position transverse to said carrier to allow vertical pivotal movement only, said locking means being releasable to allow the conveyor member to move to a trailing position and to allow both vertical and horizontal movement, and a detachable dolly for attachment to said conveyor member to allow said conveyor member to take and retain a trailing relation to said carrier.

6. A machine of the character described comprising a power carrier, a conveyor boom member hinged to said carrier for vertical and horizontal movement relative thereto, means for locking said conveyor member in a position transverse to said carrier to allow vertical swinging adjustment only, said locking means being releasable to allow the conveyor member to move to a trailing position and to allow both vertical and horizontal swinging movement, and auxiliary carrier wheels for said conveyor member to allow said conveyor to maintain a trailing relation to said carrier when said hinge is unlocked.

7. A machine of the character described comprising a power carrier, a conveyor boom member hinged to said carrier for vertical and horizontal movement relative thereto, means for locking said conveyor member in a position transverse to said carrier to allow vertical swinging adjustment only, said locking means being releasable to allow the conveyor member to move to a trailing position and to allow both vertical and horizontal swinging movement, auxiliary carrier wheels for said conveyor member to allow said conveyor to maintain a trailing relation to said carrier when said hinge is unlocked, and power means for swinging adjustment of said conveyor in a vertical plane to allow the positioning of said auxiliary carrier wheels.

8. A machine of the character described comprising a power carrier, a conveyor member having a hinged connection thereto to allow vertical and horizontal movement, said hinged connection comprising a hinge member pivoted to said carrier for horizontal movement relative thereto, and pivotal connecting means between said conveyor member and said hinge member to allow vertical swinging adjustment of said conveyor member.

9. A machine of the character described comprising a power carrier, a conveyor member having a hinged connection thereto to allow vertical and horizontal movement, said hinged connection comprising a hinge member pivoted to said carrier for horizontal movement relative thereto, and pivotal connecting means between said conveyor member and said hinge member to allow vertical swinging adjustment of said conveyor member and means for moving said conveyor member vertically relative to said hinged member.

10. A machine of the character described comprising a power carrier, a conveyor member having a hinged connection thereto to allow vertical and horizontal movement, said hinged connection comprising a hinge member pivoted to said carrier for horizontal movement relative thereto, pivotal connecting means between said conveyor member and said hinge member to allow vertical swinging adjustment of said conveyor member, and means for moving said conveyor member vertically relative to said hinged member, said last means comprising a vertically adjustable trunnion.

11. A machine of the character described comprising a power carrier, a conveyor member having a hinged connection relative thereto to allow vertical and horizontal movement of said conveyor member, said hinged connection comprising a hinge member pivoted to said carrier for horizontal movement relative thereto, a trunnion block mounted for vertical movement on said hinge member and arranged for pivotal connection with said conveyor member, and means for accurately adjusting the vertical position of said trunnion block.

12. A machine of the character described comprising a power driven portable carrier, a frame of generally obtuse triangular shape mounted on said carrier in transverse relation thereto with the base portion overlying the side of the road and the apex portion overhanging the pavement alongside the carrier, an endless chain belt operating on said frame having ground cutting and conveying buckets thereon and arranged to travel outwardly on the base portion and travel inwardly on one side of the frame to dump the dirt, and means adjacent the outer end of said frame to retain the dirt in the buckets to cause it to be carried inwardly and adjustable to cause the dirt to be discharged outwardly.

13. A machine of the character described comprising a power driven portable carrier, a frame of generally obtuse triangular shape mounted on said carrier in transverse relation thereto with the base portion overlying the side of the road and the apex portion overhanging the pavement alongside the carrier, an endless chain belt operating on said frame having ground cutting and conveying buckets thereon for finishing a road shoulder and ditch and arranged to travel outwardly on the base portion and travel inwardly on one side of the frame to dump the dirt, means adjacent the outer end of said frame to retain the dirt in the buckets to cause it to be carried inwardly and adjustable to cause the dirt to be discharged outwardly, scrapers adjacent said buckets conforming to the shape of the road shoulder and ditch, and an upwardly extending inturned flange for finishing the back slope.

14. A road machine of the character described, comprising a power carrier arranged to travel on a pavement, a substantially triangular conveyor frame having an outwardly extending apex portion, a conveyor movable on said frame to finish a road shoulder and movable around said apex to finish a side slope, said apex portion being pivoted adjacent the finishing path of said conveyor, and means adjacent the return path of said conveyor for changing the angle of the apex portion relative to the shoulder portion, said last means forming a combined adjusting and retaining means for said apex portion.

15. A conveyor boom for a road finishing machine of the character described comprising a substantially triangular frame having an outwardly extending apex portion mounted for angular adjustment, a continuous conveyor movable around said frame and apex portion for simultaneously finishing a road shoulder and a side slope respectively, and means for controlling the adjustment to vary the angular relation of the shoulder and side slope to conform to various specification requirements.

16. In a machine of the character described, an endless conveyor having an outwardly moving cutting flight, an inwardly moving non-cutting flight, said cutting flight providing a shoulder finishing portion and a side slope finishing portion, and means for varying the angular relation of the shoulder and side slope portions.

17. In a machine of the character described, an endless conveyor having oppositely moving flights, one of said flights forming a shoulder finishing portion and a side slope finishing portion, and means for varying the angular relation of the shoulder and side slope portions.

18. In a machine of the character described, a vehicle carrier, a transverse frame mounted thereon in a substantially vertical plane, an endless conveyor traveling on said frame and having an upper flight and a lower flight, and guard plates carried by the frame to prevent dirt from the conveyor from falling on the finished work and to direct it to fall in front of the lower flight.

19. In a machine of the character described, a power driven carrier, a transverse frame mounted thereon in a substantially vertical plane, an endless conveyor traveling on said frame and having an upper flight and a lower flight, a support for said upper flight, an inclined guard plate secured to said support and positioned to direct all of the dirt falling from said upper flight to the ground in front of said lower flight, and an upwardly extending guard on said support arranged to prevent dirt falling from the back of said lower flight and to direct it to said inclined guard plate.

20. A machine of the character described comprising a power driven carrier, a conveyor boom member in transverse relation to said carrier and having conveyor scrapers thereon, power means for driving said scrapers, means connecting said boom and said carrier and including a vertical axis and a horizontal axis in substantially fixed transverse relation and arranged to allow said boom member to assume a trailing position or a transverse position relative to said carrier and to allow free vertical movement during any lateral movement.

21. In a road finishing machine of the character described and having a conveyor boom member movable in horizontal and vertical planes, an endless conveyor on said boom member and having oppositely moving flights, one of said flights forming a shoulder finishing portion and a side slope finishing portion, means on said boom member for simultaneously finishing a back slope in angular relation with one of said other slopes, and means for varying the angular relation of said back slope finishing means and said side slope finishing portion with said shoulder finishing portion.

WILLIAM F. ECKERT.